United States Patent [19]

Inouchi

[11] Patent Number: 5,843,257

[45] Date of Patent: Dec. 1, 1998

[54] METHOD OF DEVELOPING AN ADHESIVE AND A ROTARY HOLDING TABLE FOR CARRYING OUT THE SAME METHOD

[75] Inventor: Masami Inouchi, Tokushima, Japan

[73] Assignee: Kitano Engineering Co., Ltd., Komatsushima, Japan

[21] Appl. No.: 800,475

[22] Filed: Feb. 14, 1997

[30] Foreign Application Priority Data

Feb. 15, 1996 [JP] Japan .................................... 8-052294

[51] Int. Cl.$^6$ .................................................. B32B 31/16
[52] U.S. Cl. .......................... 156/74; 156/285; 156/295; 156/379.8; 156/578
[58] Field of Search .................................... 156/74, 275.5, 156/275.7, 285, 295, 379.8, 575, 578, 582; 427/240; 118/52, 55

[56] References Cited

U.S. PATENT DOCUMENTS

| 4,227,347 | 10/1980 | Tam | ................................... | 51/235 |
| 4,877,475 | 10/1989 | Uchida et al. | ..................... | 156/273.7 |

FOREIGN PATENT DOCUMENTS

| 61126648 | 6/1986 | Japan . |
| 63124247 | 5/1988 | Japan . |
| 01101126 | 4/1989 | Japan . |
| 06309839 | 11/1994 | Japan . |
| 08036786 | 2/1996 | Japan . |

*Primary Examiner*—Michael W. Ball
*Assistant Examiner*—Michael A. Tolin
*Attorney, Agent, or Firm*—Flynn, Thiel, Boutell & Tanis, P.C.

[57] ABSTRACT

A method and apparatus for effectively developing an adhesive in a storage disc including differentiating a suction force applied from a surface of a rotary holding table from a drawing force applied from a boss. The method includes holding a storage disc on a rotary table by suction, the storage disc including two disc-shaped resin substrates each having a central hole and adhesive interposed therebetween. A boss of the rotary holding table is inserted into the central holes of the two disc-shaped resin substrates, and individual suction and drawing passages are provided for holding the storage disc on the rotary table and for drawing the adhesive by way of the boss, respectively.

17 Claims, 9 Drawing Sheets

F I G. 4 (A)
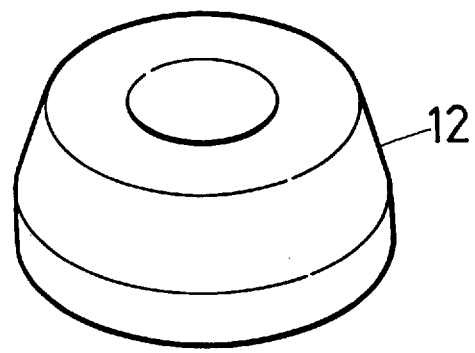
F I G. 4 (B)
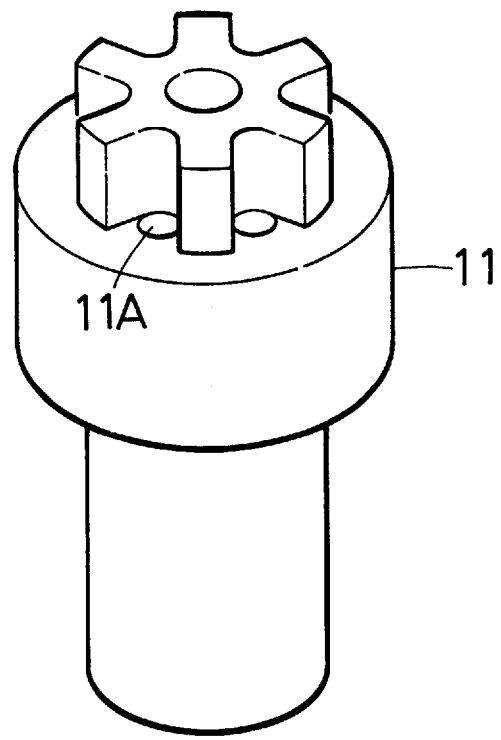

STEP (1)

STEP (2)

STEP (3)

STEP (4)

STEP (5)

METHOD OF DEVELOPING AN ADHESIVE AND A ROTARY HOLDING TABLE FOR CARRYING OUT THE SAME METHOD

BACKGROUND OF THE INVENTION

1. Field of the Invention

The present invention relates to a technique for bonding two disc-shaped substrates to each other to form a storage disc, more particularly, to a method of developing an adhesive interposed between the two disc-shaped substrates and a rotary holding table for carrying out the method.

2. Prior Art

The use of computers, especially personal computers, has increased remarkably recently, and the kinds of storage media to be used thereby and the capacity of such a storage media, such as storage discs, has increased. There are a magnetic disc, an optical disc (e.g., CD-ROM), an optical magnetic disc (e.g., MO), etc. as the storage disc. The demand for optical discs as storage discs has increased recently.

Exemplifying an optical disc called a DVD, a disc-shaped resin substrate that is a single plate constituting the DVD is required to have a thickness of 0.6 mm and an outer diameter of 120 mm and an inner diameter of its central hole of 15 mm. If such a disc-shaped resin substrate is formed of a single substrate, it is low in mechanical strength and is easily deformable. Accordingly, the disc-shaped resin substrates each having the same thickness (0.6 mm) are bonded to each other to form an integrated substrate. For example, FIG. 7 schematically generally shows a DVD serving as the optical disc formed of two disc-shaped resin substrates (a first disc-shaped resin substrate D1 and a second disc-shaped resin substrate D2) which are bonded to each other.

Briefly speaking, the first disc-shaped resin substrate D1 is made of a transparent polycarbonate resin and is formed by e.g., an injection molding machine. Irregular signal pits (signal holes) serving as information signals such as sound are transferred to one surface of the first disc-shaped resin substrate D1. A reflection film D11 (e.g., aluminum film, etc.) is formed on the signal pits, and a protection film D12 is formed on the reflection film D11 to prevent the signal pits from being damaged.

The second disc-shaped resin substrate D2 formed of the transparent polycarbonate resin, etc. is bonded onto the first disc-shaped resin substrate D1 in which the signals or information is stored by way of an adhesive R (see FIG. 7(A)).

The second disc-shaped resin substrate D2 may be directly bonded onto the first disc-shaped resin substrate D1 by way of the adhesive R without forming the protection film D12 on the first disc-shaped resin substrate D1.

An optical disc D formed by bonding the two disc-shaped resin substrates D1 and D2 receives light reflected from the reflection film D11 using laser beam by a light detector, not shown, to thereby reproduce the signals.

It should be understood that the optical disc called the DVD can employ the second disc-shaped resin substrate D2 in which signals or information is stored (see FIG. 7(B)).

Since the high density storage disc including the DVD does not include a single substrate or plate, but frequently includes plural substrates or plates, the first disc-shaped resin substrate D1 and the second disc-shaped resin substrate D2 must be bonded to each other.

The following series of steps are performed to form an integrated storage disc (i.e., an optical disc) by bonding each single plate (see FIG. 6).

Step 1: placing the first disc-shaped resin substrate D1 on a rotary holding table X;

Step 2: coating the adhesive R onto the first disc-shaped resin substrate D1;

Step 3: placing the second disc-shaped resin substrate D2 on the first disc-shaped resin substrate D1;

Step 4: developing the adhesive R interposed between the first and second disc-shaped resin substrates D1 and D2; and Step 5: curing the thus developed adhesive R.

Briefly explaining the steps set forth above, first, in Step 1, the first disc-shaped resin substrate D1 having the signal pits coated with the reflection film and the protection film is uniformly sucked by and held on the rotary holding table X, because there are defined a plurality of suction holes on the surface of the rotary holding table X for sucking and holding the first disc-shaped resin substrate D1 by means of negative pressure supplied through a suction passage communicating with the suction holes, not shown.

In the Step 2 for coating the adhesive R, the adhesive R, e.g., ultraviolet curing resin is discharged from a discharge nozzle N while the rotary holding table X on which the first disc-shaped resin substrate D1 is placed is rotated at low speed. The adhesive R has a different track or shape on the first disc-shaped resin substrate D1 depending on a manner how it is discharged from the discharge nozzle N, but it is preferable to have an O track as shown in FIG. 6.

In step 3, the transparent second disc-shaped resin substrate D2 is placed on the first disc-shaped resin substrate D1 which is coated with the adhesive R.

In the next Step 4, the adhesive R interposed between the first and second disc-shaped resin substrates D1 and D2 is developed to extend uniformly between the first and second disc-shaped resin substrates D1 and D2. A member denoted by Z is used in Step 4 for working the end of the first and second disc-shaped resin substrates D1 and D2, but the explanation thereof is omitted. This development of the adhesive R is performed by rotating the rotary holding table X at a high speed (normally, several thousands rpm or more for about several minutes) in a state where the storage disc D, namely, the integrated disc-shaped resin substrate is formed by bonding the first and second disc-shaped resin substrates D1 and D2.

When the rotary holding table X is rotated at a high speed, surplus adhesive R which is present between the bonded first and second disc-shaped resin substrates D1 and D2 is scattered outside while it is developed, and air (air bubble, etc.) confined between the first and second disc-shaped resin substrates D1 and D2 is discharged so that the adhesive R can be uniformly developed between the first and second disc-shaped resin substrates D1 and D2. In this developing step, the adhesive R is merely developed outwardly, however, it is difficult to extend the adhesive to the central portions of the first and second disc-shaped resin substrates D1 and D2.

That is, although the adhesive R is developed outwardly owing to the centrifugal force, etc., it does not sufficiently extend to a region close to the central holes of the first and second disc-shaped resin substrates D1 and D2 so that it is short of development toward the central holes thereof (inner direction) and air remains between the first and second disc-shaped resin substrates D1 and D2.

Accordingly the adhesive R is drawn through the boss which is inserted into the central hole of the storage disc.

Conventionally, the drawing of the adhesive R is performed through a drawing port P1 defined in the boss 1A, and a drawing passage communicating with the drawing port P1 communicates with a suction passage communicating with suction holes P2 defined in the surface of the rotary holding table X as set forth in Step 2, wherein the drawing and suction passages are connected to the same suction source.

FIG. 9 shows a conventional rotary holding table X from which it is understood that the drawing passage from the boss 1A and the suction passage from the suction holes P2 defined in the surface of the rotary holding table X merge inside a rotary shaft 3A integrated with the boss 1A.

In the conventional rotary holding table X, both passages merge inside the rotary shaft 3A, then they are connected to a common suction source.

In Step 5, the first and second disc-shaped resin substrates D1 and D2 are irradiated with ultraviolet in a state where they are laid on top of another and are rotated (e.g., at about 60 rpm), thereby curing an adhesive, e.g., ultraviolet curing resin layer. More specifically, the adhesive is irradiated with the ultraviolet issued from an ultraviolet optical source L having a reflection mirror at the back side thereof, thereby effectively curing the adhesive.

The curing step is varied depending on the kind of the adhesive R to be used, and hence there is employed an appropriate curing method conforming to the properties of the adhesive R.

In such a manner, the bonding and integration of the first and second disc-shaped resin substrates D1 and D2 are completed.

The developing step among all the five steps permits the adhesive R to uniformly extend between the first and second disc-shaped resin substrates D1 and D2, and it is considered to be the important point.

It is very important to consider the degree or strength of drawing from the boss so as to sufficiently permit the adhesive R to extend in the region close to the central holes of the first and second disc-shaped resin substrates D1 and D2.

The strength of drawing of the adhesive R requires delicate adjustment depending on viscosity of the adhesive R and the rotation speed of the rotary holding table, etc., and it is controlled by adjusting the drawing force in the boss.

On the other hand, since the suction of the adhesive R from the surface of the rotary holding table X is delicately varied depending on the number of revolutions of the rotary holding table, the weight and the shapes of the first and second disc-shaped resin substrates D1 and D2, etc., the suction force must be controlled to correspond to such a variation.

However, since the suction of the storage disc D from the surface of the rotary holding table and the drawing of the adhesive R from the boss are commonly performed through a common passage, the strength of suction and that of drawing inevitably become the same level.

Accordingly, since it is impossible to differentiate the suction force applied from the drawing force, the force to draw the adhesive R from the boss is hardly optimized for development of the adhesive R.

On the other hand, in order to appropriately perform the development, the drawing from the boss and the suction from the surface of the rotary holding table are required to be performed in different timings. However, since both the suction and the drawing are performed through the passage as set force above, the starting time of the suction and that of the drawing, and the ending time of the suction and that of the drawing respectively become the same, which is however not satisfactory in terms of uniform development of the adhesive R.

SUMMARY OF THE INVENTION

The present invention solved the problems under the aforementioned background of the invention. That is, it is an object of the present invention to provide a method of developing adhesive in the storage disc accurately and a rotary holding table for carrying out the same method. Further, it is another object of the invention to provide a method of developing adhesive and a rotary holding table for carrying out the same method capable of differentiating the suction force applied from the surface of the rotary holding table from the drawing force applied from the boss, and also differentiating both timings thereof.

Meanwhile the inventors of the present application have researched these problems, and found out that it is possible to suck and draw through individual passages by dividing the common passage into a suction passage at a driving portion and a drawing passage at a static portion, and completed the present invention based on this finding.

That is, a first aspect of the present invention is a method of developing an adhesive comprising sucking and holding a storage disc composed of two disc-shaped resin substrates each having a central hole and adhesive interposed therebetween, the storage disc being placed on a rotary holding table, inserting a boss of the rotary holding table into the central holes of the two disc-shaped resin substrates so as to suck and rotate the storage disc and individually providing a suction passage for sucking and holding the storage disc and a drawing passage for drawing the adhesive by way of the boss.

A second aspect of the invention is a rotary holding table for developing an adhesive by placing a storage disc thereon to rotate the storage disc, wherein the storage disc is composed of two disc-shaped resin substrates each having a central hole, and the adhesive interposed therebetween, the rotary holding table comprising a placing part on which the storage disc is placed and which has suction holes for holding the storage disc, and a boss which is insertable into central holes of the two disc-shaped resin substrates and which has a drawing port for drawing the adhesive, the rotary holding table further comprising a suction passage communicating with the suction holes and a drawing passage communicating with the drawing port wherein the suction passage and the drawing passage are individually provided.

A third aspect of the invention includes the drawing passage communicating with the drawing port of the boss being defined inside a rotary supporting shaft, and the suction passage communicating with the suction holes for holding the storage disc being provided between the rotary support shaft and a fixed support shaft for housing and supporting the rotary support shaft.

A fourth aspect of the invention includes the suction passage is connected to an external negative pressure source by way of a through port defined in the fixed support shaft.

A fifth aspect of the invention includes the drawing passage being connected to a rotary joint.

A sixth aspect of the invention includes the boss being removable.

A seventh aspect of the invention includes the drawing port defined in the boss being formed by a gap between a boss body and a cover body.

Since the drawing strength from the boss is separately set from the suction strength from the rotary holding table with such an arrangement, the drawing strength and the suction strength and the timings thereof can be respectively controlled, thereby excellently performing the development of the adhesive.

BRIEF DESCRIPTION OF THE DRAWINGS

FIGS. 4(A) and 4(B) are perspective views respectively showing a cover part of a boss and a base part of the boss;

FIGS. 8(A), 8(B) and 8(C) are views showing a suction passage and a drawing passage, wherein FIGS. 8(A) and 8(B) are suction and drawing passages according to the present invention, and FIG. 8(C) is a conventional passage.

PREFERRED EMBODIMENT OF THE INVENTION

A method of developing adhesive and a rotary holding table for carrying out the method will be now described with reference FIGS. 1 to 8.

Figure 1:
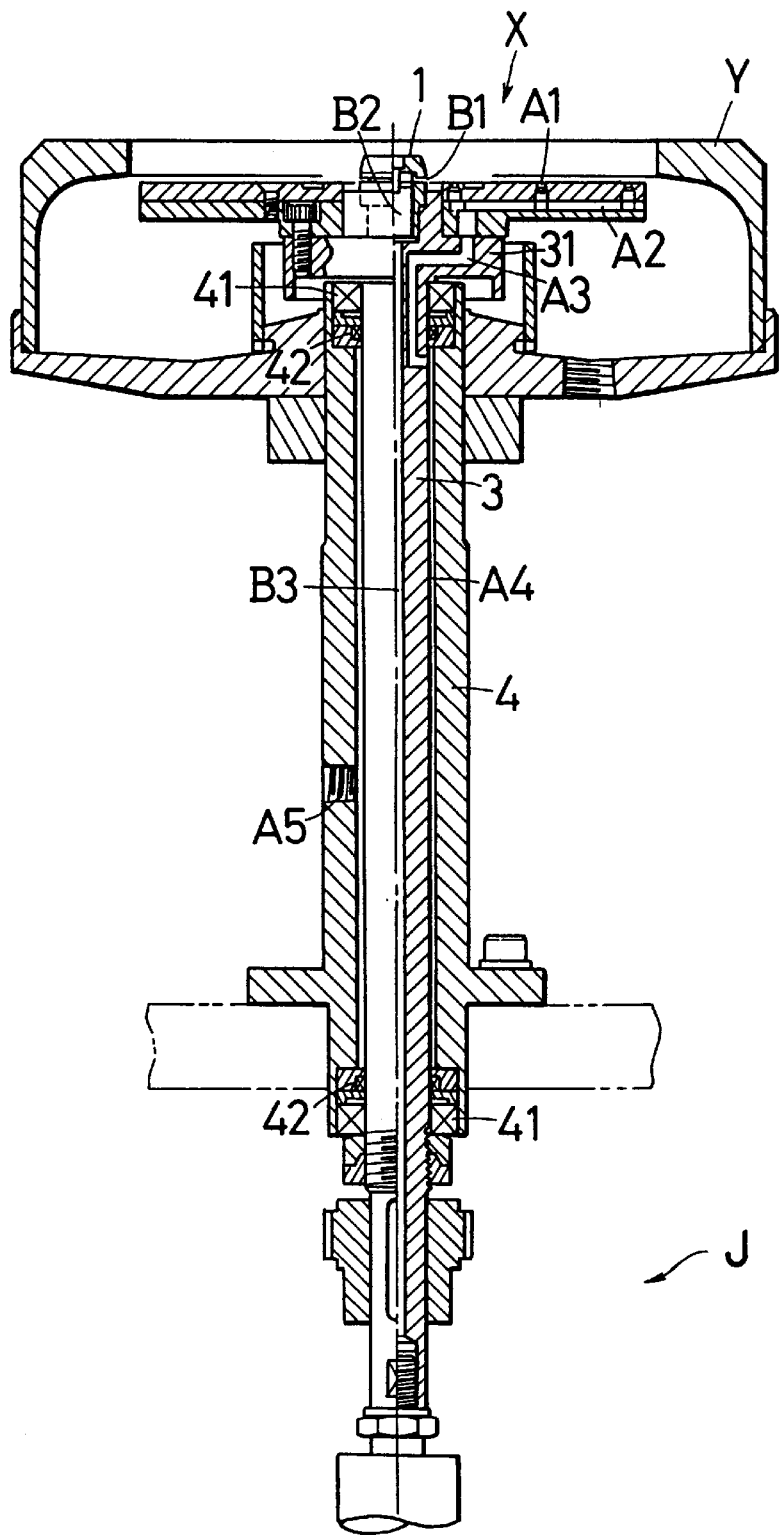
FIG. 1 is a cross sectional view of a rotary holding table on which a storage disc is placed.
Figure 2:
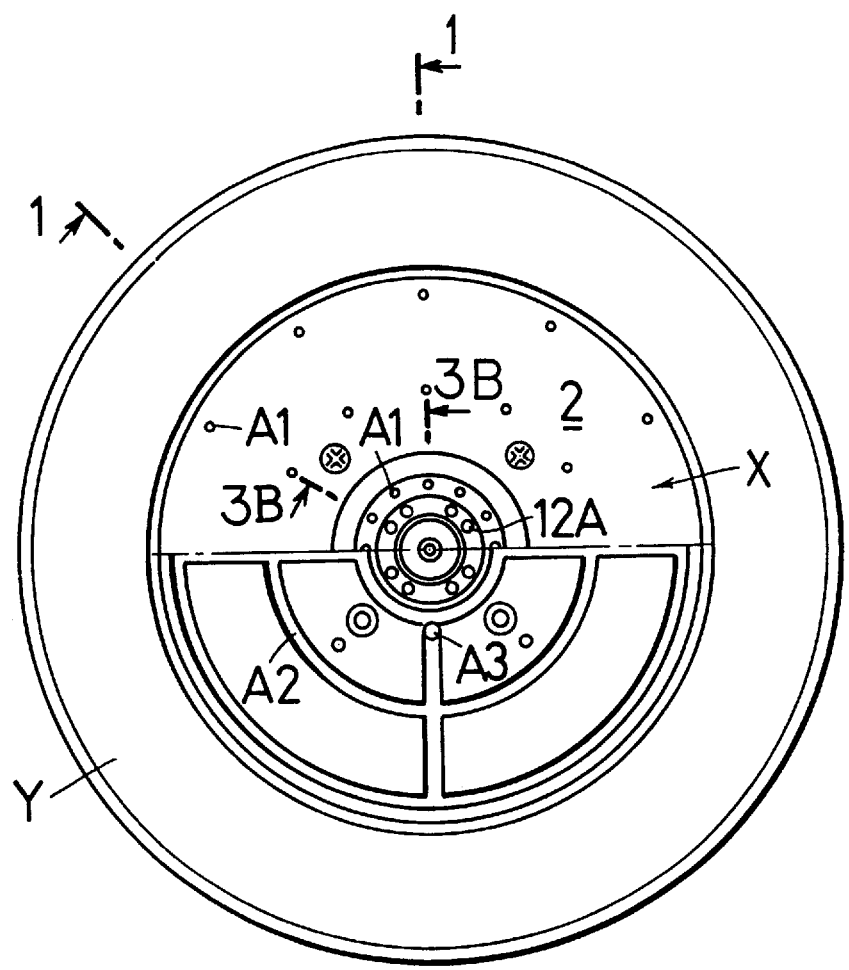
FIG. 2 is a plan view showing the rotary holding table and a suction passage on the rotary holding table through which air passes.

FIG. 1 is a cross sectional view of a rotary holding table X taken along the line 1—1 in FIG. 2.

FIG. 2 is a plan view of the rotary holding table X, wherein the lower half shows a state where air is sucked through the suction passage.

Figure 3:
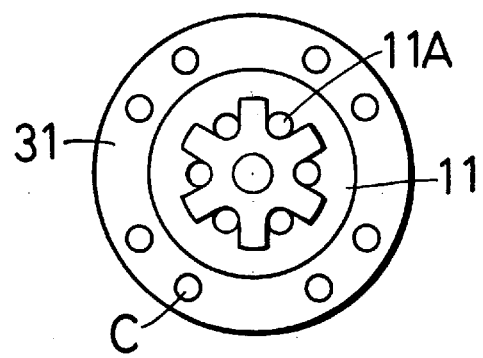
FIGS. 3(A) is an enlarged view showing a main portion of the rotary holding table.
FIG. 3(B) is a cross sectional view of the rotary holding table taken along the line 3B—3B in FIG. 2.
Figure 3:
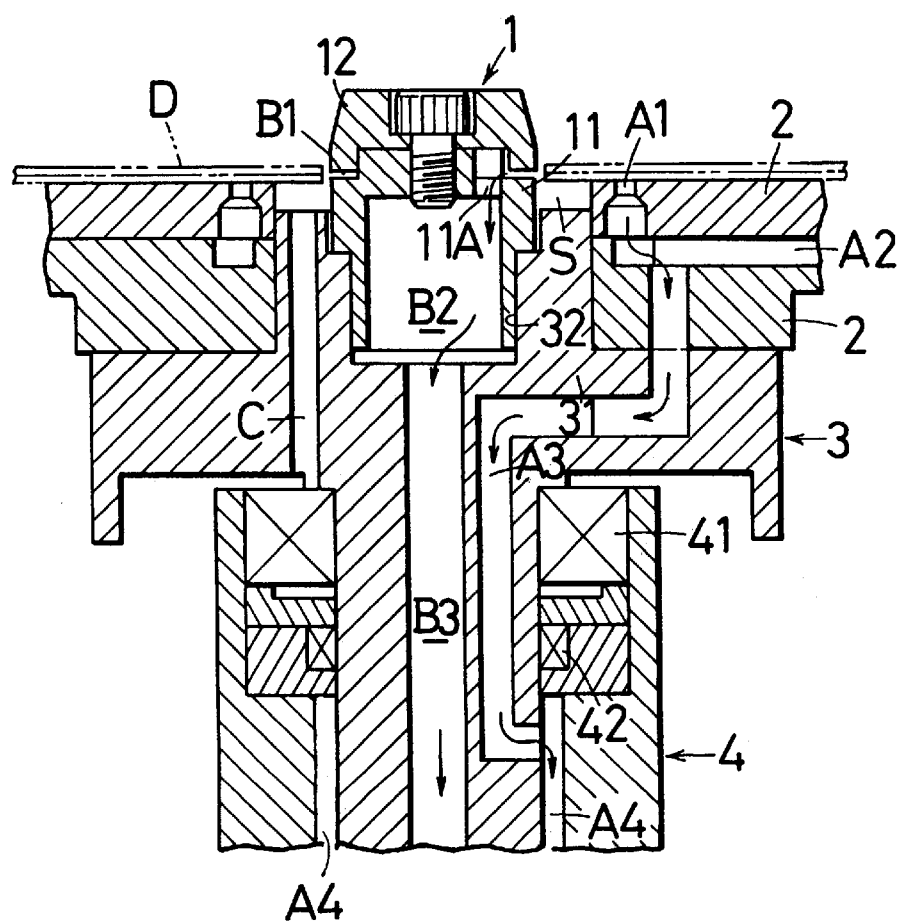

FIG. 3 shows enlarged views showing a main portion of the rotary holding table, wherein FIG. 3(A) is a view showing a large diameter part of a rotary support shaft from the upper side thereof in a state where a cover part of the boss is removed, and FIG. 3(B) is a cross sectional view of the rotary holding table taken along the line 3B—3B in FIG. 2.

A receiving dome Y, which is movable vertically, is provided around the rotary holding table X for preventing the adhesive R from scattering when the adhesive R is developed, but the detailed explanation of the dome is omitted.

As shown in FIG. 1, the rotary holding table X comprises a placing part on which first and second disc-shaped resin substrates D1 and D2 are placed and a rotary support shaft 3 for supporting the placing part. The placing part includes a table body 2 which engages with a large diameter part 31 of the rotary support shaft 3. The boss 1 engages with and is attached to an engaging hole 32 defined in the large diameter part 31 of the rotary support shaft 3.

The boss 1 can be removed from the engaging hole 32 but it can be temporarily fixed to the engaging hole 32 so as not to leak air therethrough using an adhesive when the boss 1 is engaged into and set to the engaging hole 32. The boss 1 is divided into a base part 11 and a cover part 12 wherein the cover part 12 is fixed to the base part 11 by way of screws, etc. The drawing of the adhesive R from the boss 1 is performed through a drawing port B1 formed by a gap defined between the base part 11 and the cover part 12. The drawing port B1 communicates with an inner space B2 of the boss 1 by way of small holes 11A, described later, and the inner space B2 communicates with a passage B3 formed in the rotary support shaft 3.

The lower end of the rotary support shaft 3 is jointed with a rotary joint J, and the passage B3 defined therein is connected to an external controlled negative pressure source (e.g., a vacuum suction device is employed as the negative pressure source), not shown, by way of the rotary joint J. In such a manner, the continuous drawing passage B for drawing the adhesive comprises the drawing port B1, the inner space B2 and the passage B3.

The table body 2 is a part (placing part) on which the storage disc D is directly placed and it is formed to have a flat seating surface. A plurality of suction holes A1 are defined in the surface of the table body 2, and they communicate with a passage A3 of the large diameter part 31 of the rotary support shaft 3 by way of a passage A2 inside the table. The passage A3 opens into a space (gap) A4 defined between the rotary support shaft 3 and the fixed support shaft 4. The rotary support shaft 3 is rotatably supported by the fixed support shaft 4 by way of a bearing 41, while the space A4 is formed as a cylindrical space which is sealed between the rotary support shaft 3 and the fixed support shaft 4. Accordingly, airtightness is guaranteed between the fixed support shaft 4 and the rotary support shaft 3 using a seal body 42.

The space A4 opens to the outside through a through port A5 which is defined in the fixed support shaft 4 in the longitudinal direction at an appropriate position thereof, wherein the space A4 is connected to the controlled negative pressure sources, not shown, by a pipe, etc. by way of the through port A5.

The continues suction passage A for sucking the storage disc D is formed by the suction holes A1, the passage A2, the passage A3, the space A4 and the through port A5. When the suction source, not shown, is operated, the suction holes A1 negatively pressurized so that the suction force is applied to the surface (seating surface) of the table body 2 serving as the placing part, and hence the storage disc D placed on the placing part is sucked and held by the suction force.

On the other hand, there is provided a timing pulley at the lower end of the rotary support shaft 3, wherein the rotary holding table X is rotated as a whole when the rotary support shaft 3 is rotated by way of a timing belt, not shown. Meanwhile, when the rotary holding table X is assembled, the table body 2 is first engaged in and fixed to the large diameter part 31 of the rotary support shaft 3. Since the large diameter part 31 projects from the center of the table body 2, the boss 1 may be engaged in the engaging hole 32 defined in the large diameter part 31.

In the case of replacement of the boss 1 with another because of the difference of the size of the central hole of the storage disc, the boss 1 is removed from the large diameter part 31 of the rotary support shaft 3 in a state where the storage disc D is not placed on the placing part, and another different boss may be engaged in the large diameter part 31.

Depending on the kinds of the storage discs, the table body 2 must be replaced with another table body 2 having different size. In such a case, another table body 2 conforming to the storage disc must be attached.

In a state where the storage disc D is placed on the placing part, a space S is defined between the boss 1, the upper surface of the large diameter part 31 of the rotary support shaft 3 and the lower surface of the storage disc D. The space S is a part for introducing fresh air when the adhesive R is drawn from the boss 1, described later. The space S is opened to the outside through an introducing passage C defined in the large diameter part 31.

FIG. 4 is a perspective view showing the boss 1 in FIG. 1, wherein FIG. 4(A) shows a cover part and FIG. 4(B) shows a base part.

As shown in FIGS. 4(A) and 4(B), the boss 1 comprises the base part 11 and the cover part 12, wherein there is defined a gap therebetween to form the drawing port B1 when the cover part 12 is attached to the base part 11.

The base part 11 has a starfish shape in the cross section and this shape occupies a given area at the upper part thereof. A plurality of small holes 11A are defined in the base part 11 at the crotches of the starfish part of this base part 11, and they open to the boss 1, more particularly to the inner space B2 of the base part 11.

The inner space B2 of the boss 1 communicates with the passage B3 formed by penetrating the rotary support shaft 3, as set forth above. Accordingly, the gap defined between the base part 11 and the cover part 12, namely the drawing port B1 is formed continuously around the entire surface of the boss 1 so that the uniform drawing operation in all directions can be performed. In such a manner, the boss 1 comprises the base part 11 and the cover part 12, but the base part 11 and the cover part 12 may be integrated with each other.

Figure 9:
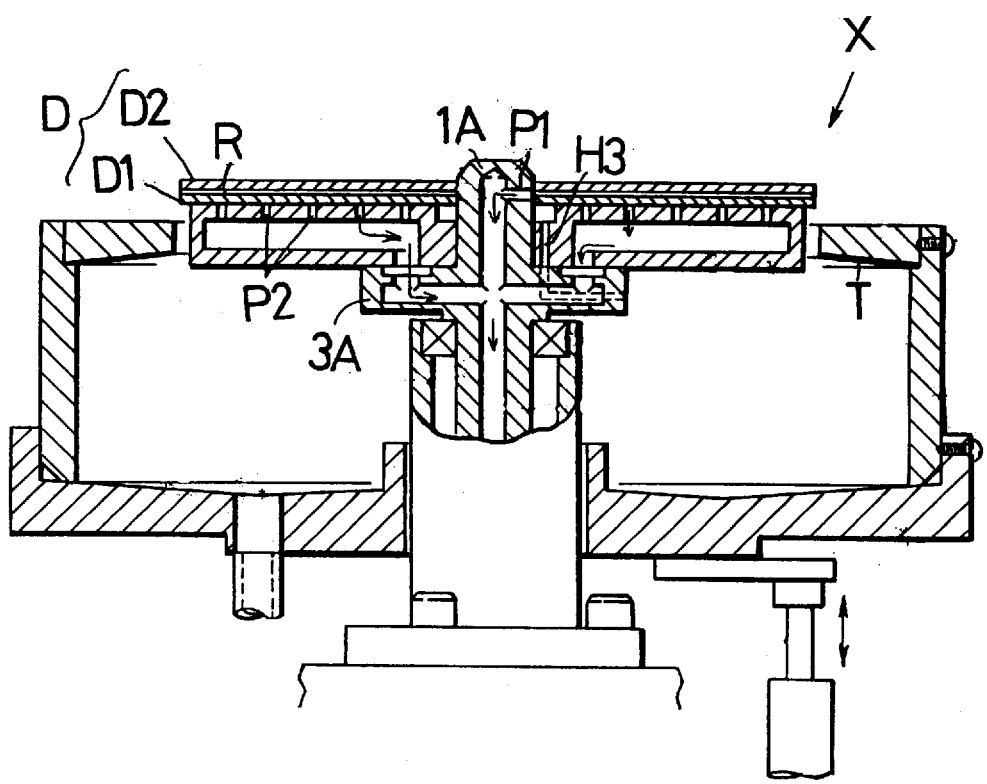
FIG. 9 is a cross sectional view showing a conventional rotary holding table.

Incidentally, since the boss 1 has been conventionally bored to directly define a plurality of drawing ports P1 (see FIG. 9), the drawing force is liable to be strong at only the parts where the drawing ports P1 are defined, and hence the entire surface of the boss 1 is not always uniformly sucked.

The manner for developing the adhesive R using the rotary holding table X will next be described.

As shown in FIG. 1, second disc-shaped resin substrate D2 which is fixed to the first disc-shaped resin substrate D1 by way of the adhesive R, e.g., ultraviolet curing resin, is placed on the rotary table X. The suction source of the suction passage A is operated so as to suck and hold the storage disc D by way of the suction holes A1 (normally at a negative pressure of about several tens cmHg). The suction force applied from the suction passage A communicating with the drawing port for sucking and holding the storage disc D is optimized considering the weight of the first and second disc-shaped resin substrates D1 and D2 and the maximum rotation speed of the rotary holding table X when the adhesive R is developed.

Sequentially, the rotary holding table X is rotated at high speed and the force to suck and hold the adhesive from the drawing passage B is operated substantially simultaneously with or slightly later than the rotation of the rotary holding table X so as to suck the adhesive R by way of the drawing port B1 (normally at the negative pressure of about several tens cmHg). The adhesive R interposed between the first and second disc-shaped resin substrates D1 and D2 is developed due to the centrifugal force caused by the high speed rotation so as to scatter the surplus adhesive to the outside.

At this time, air interposed between the first and second disc-shaped resin substrates D1 and D2 is also discharged outside together with the surplus adhesive.

Figure 5:
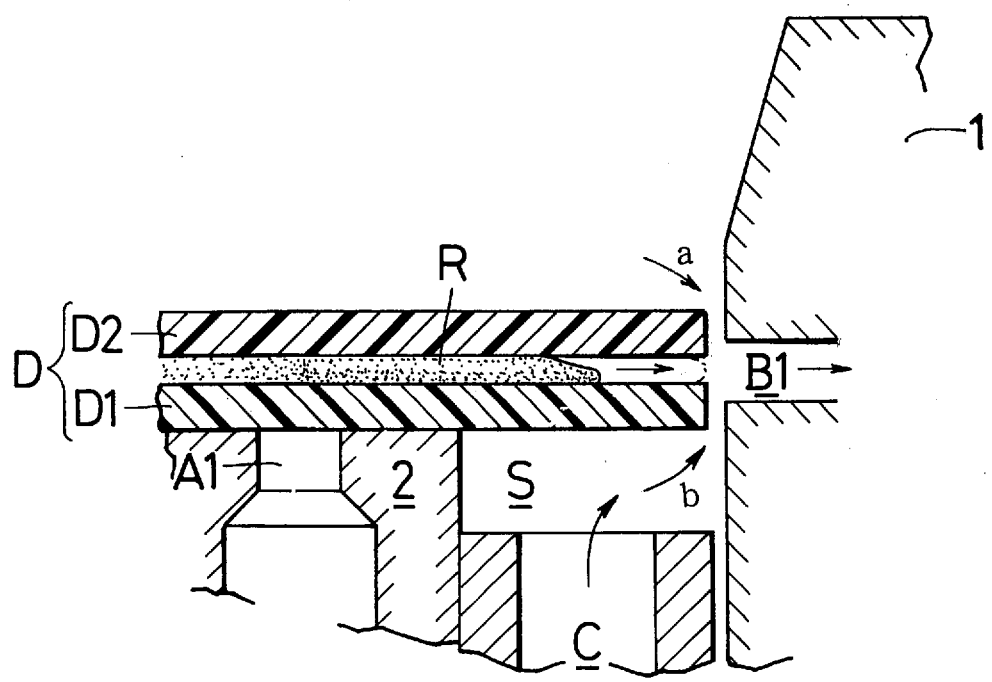
FIG. 5 is a schematic view showing a state where an adhesive is sucked.
Figure 6:
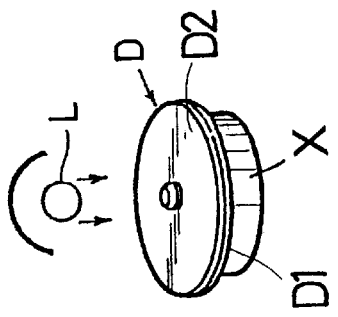
FIG. 6 is a schematic process view showing general steps for manufacturing a storage disc by bonding a second disc-shaped resin substrate onto a first disc-shaped resin substrate by way of the adhesive.
Figure 6:
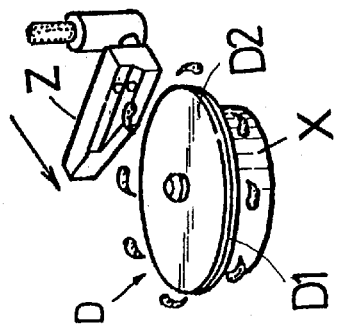
Figure 6:
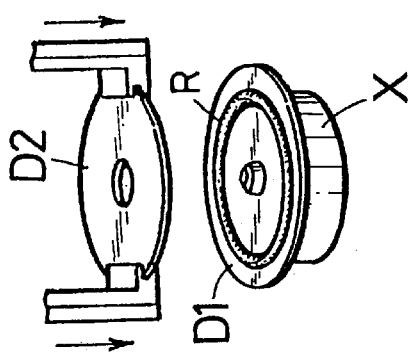
Figure 6:
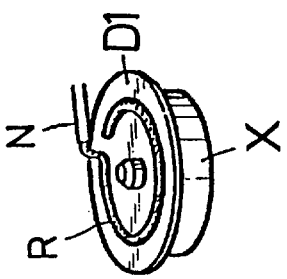
Figure 6:
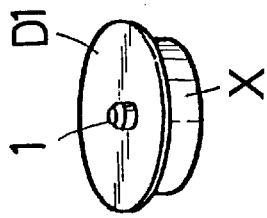
Figure 7:
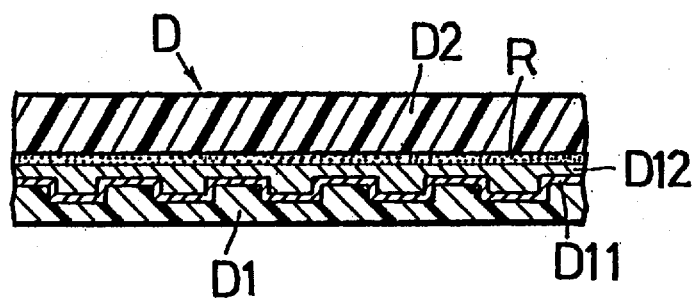
FIGS. 7(A) and 7(B) are schematic cross sectional views of an optical disc.
Figure 7:
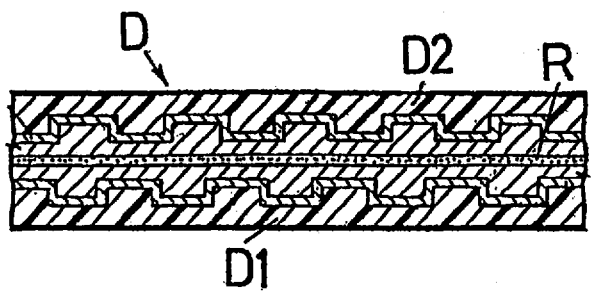
Figure 8:
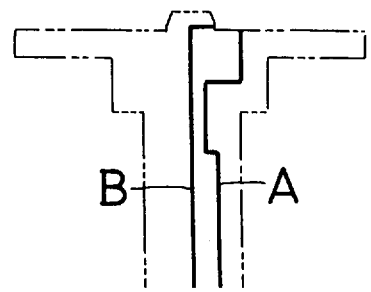
Figure 8:
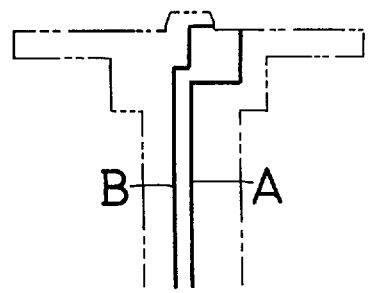
Figure 8:
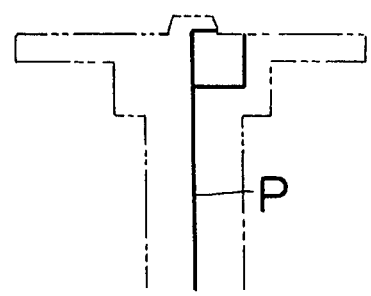

FIG. 5 schematically shows a state where the adhesive R is drawn toward a part close to the central holes of the first and second disc-shaped resin substrates D1 and D2 when air is drawn through the drawing port B1 of the boss 1 at the start of the drawing using the rotary holding table X including the boss 1 and the part of the storage disc D.

When the adhesive R is drawn from the boss 1, fresh air introduced from the upper surface of the storage disc D (arrow a) passes through the gap defined between the upper side of the second disc-shaped resin substrate D2 of the storage disc D and the boss 1 and is drawn through the drawing port B1, while fresh air introduced from the lower surface of the storage disc D (arrow b), which fresh air is introduced from the space S by way of the introducing passage C, passes through the gap between the lower side of the first disc-shaped resin substrate D1 and the boss 1 and is drawn through the first disc-shaped resin substrate D1.

With such a drawing operation, the adhesive R interposed between the first and second disc-shaped resin substrates D1 and D2 is drawn in the direction of the center of the storage disc D. The difficulty in drawing the adhesive R from the boss 1 in the developing step is that the adhesive R must be developed so that the adhesive stops at a part immediately in front of the end of the central hole so as not to be leaked outside from the central hole of the storage disc D. When the drawing is performed excessively, the adhesive is leaked out so as to contaminate the surface of a part close to the central hole of the storage disc D, which greatly reduces the quality of the storage disc D.

The degree of drawing from the boss 1 is prudently determined considering the viscosity of the adhesive R, the rpm of the rotary holding table X, etc., and it becomes a key point of the developing step. When the drawing is performed properly, the adhesive R which is present at a part close to the central holes of the first and second disc-shaped resin substrates D1 and D2 uniformly extends between the first and second disc-shaped resin substrates D1 and D2.

As described in detail above, the present invention is not limited to the aforementioned embodiment, but it can be modified variously in a scope not to deviate from the scope thereof For example, as means for separating the suction passage from the drawing passage, there is exemplified a case (see FIG. 8(A)) where the drawing passage B communicating with the drawing port of the boss is provided inside the rotary support shaft, and the suction passage A communicating with the suction holes defined in the placing part is provided in a space between the rotary support shaft and the fixed support shaft. However, the drawing passage B of the boss may be provided in the space between the rotary support shaft 3 and the fixed support shaft 4 and the suction passage A may be provided inside the rotary support shaft 3 (see FIG. 8(B)).

FIG. 8(C) shows a conventional passage wherein the suction passage and the drawing passage form a common passage P.

According to the present invention, the drawing start time and the suction start time can be respectively freely set. A structure of the boss is exemplified as the split type but it may be of an integrated type as a matter of course.

The drawing from the boss can be performed independently of the suction from the surface of the placing part of the rotary holding table, and it can be performed in a timing different from that of the suction. It is possible to utilize a space defined between the rotary support shaft and the fixed support shaft. Appropriate development of the adhesive can be performed without presence of air at the central part of the storage disc. It is possible to give a sufficient strength to the storage disc to be manufactured, and the appearance of the storage disc is enhanced.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A method of coating an adhesive interposed between two disc-shaped resin substrates each having a central hole disposed therein and together forming a storage disc, said method comprising the steps of:

placing the storage disc on a rotary table and inserting a boss of the rotary table into the central holes of the two disc-shaped resin substrates;

rotating the storage disc to spread the adhesive between the two disc-shaped resin substrates;

applying suction to the storage disc at a first pressure through a first passage disposed in the rotary table to hold the storage disc on the rotary table; and drawing the adhesive between the two disc-shaped resin substrates toward the central holes thereof by applying suction to a second passage opening at said boss at a second pressure different from said first pressure.

2. The method of claim 1 wherein a portion of said first passage is defined between a rotary support shaft of the rotary table and a fixed support shaft disposed about and rotatably supporting the rotary support shaft.

3. The method of claim 2 wherein a portion of said second passage is disposed in the rotary support shaft.

4. A rotary table for coating an adhesive interposed between two disc-shaped resin substrates each having a central hole disposed therein and together forming a storage disc, said rotary table comprising:

a rotatable support member having an orifice disposed therein;

a boss disposed centrally of said support member configured for insertion into the central holes of the two substrates, said boss having a drawing port disposed therein;

a first passage in communication with said orifice and defining therein a first suction pressure for holding the storage disc on said support member during rotation of the storage disc; and a second passage in communication with said drawing port and defining therein a second suction pressure for drawing the adhesive toward the central holes of the two substrates, said first passage and said second passage being separate from one another and said first suction pressure being different than said second suction pressure.

5. The rotary table of claim 4 further including a rotary support shaft disposed to support and rotate said support member, a substantial portion of said second passage being disposed in said rotary support shaft.

6. The rotary table of claim 5 wherein an additional portion of said second passage is disposed in said boss.

7. The rotary table of claim 5 further including a rotary support shaft disposed to support and rotate said support member and a fixed support shaft disposed about and rotatably supporting said rotary support shaft, a portion of said first passage being defined between said rotary support shaft and said fixed support shaft.

8. The rotary table of claim 7 wherein an additional portion of said first passage is disposed in said rotary support shaft.

9. The rotary table of claim 7 wherein said fixed support shaft comprises a suction port in communication with said first passage and a suction source.

10. The rotary table of claim 5 wherein said rotary support shaft includes an end connected to a rotary joint, said second passage communicating with a suction source by means of said rotary joint.

11. The rotary table of claim 4 further including a rotary support shaft disposed to support and rotate said support member and said boss, said boss being releasably attached to said rotary support shaft.

12. The rotary table of claim 4 wherein said boss includes a base part and a cover part disposed atop said base part, said drawing port being defined between said base part and said cover part.

13. A rotary holding table for coating an adhesive by placing a storage disc thereon and rotating the storage disc, the storage disc including two disc-shaped resin substrates each having a central hole and adhesive interposed therebetween, said rotary holding table comprising a part on which the storage disc is placed including suction holes for holding the storage disc thereon, a boss configured for insertion into the central holes of the two disc-shaped resin substrates and having a drawing port for drawing the adhesive, a suction passage communicating with said suction holes and a drawing passage communicating with said drawing port, said suction passage and said drawing passage being individually provided, said drawing passage being defined inside a rotary support shaft and said suction passage being defined between said rotary support shaft and a fixed support shaft for housing and supporting said rotary support shaft, said suction passage and said drawing passage being operable at different pressures from one another.

14. The rotary holding table of claim 13 wherein said suction passage is connected to an external negative pressure source by means of a through port defined in said fixed support shaft.

15. The rotary holding table of claim 13 wherein said drawing passage is connected to a rotary joint.

16. The rotary holding table of claim 13 wherein said boss is releasably attached to said rotary holding table.

17. The rotary holding table of claim 13 wherein said drawing port defined in said boss is formed by a gap between a base body of said boss and a cover body of said boss.

* * * * *